April 19, 1966 D. S. COLBURN 3,246,688
CONTROLLED TEMPERATURE APPARATUS
Filed June 28, 1962 5 Sheets-Sheet 1

DAVID S. COLBURN
INVENTOR.

BY
*Flehr and Swain*
ATTORNEYS

April 19, 1966     D. S. COLBURN     3,246,688

CONTROLLED TEMPERATURE APPARATUS

Filed June 28, 1962     5 Sheets-Sheet 2

DAVID S. COLBURN
*INVENTOR.*

BY
*Flehr and Swain*
ATTORNEYS

April 19, 1966    D. S. COLBURN    3,246,688
CONTROLLED TEMPERATURE APPARATUS
Filed June 28, 1962    5 Sheets-Sheet 3

DAVID S. COLBURN
*INVENTOR.*

BY
*Flehr and Swain*
ATTORNEYS

April 19, 1966   D. S. COLBURN   3,246,688
CONTROLLED TEMPERATURE APPARATUS
Filed June 28, 1962   5 Sheets-Sheet 4

DAVID S. COLBURN
*INVENTOR.*

BY
*Flehr and Swain*
ATTORNEYS

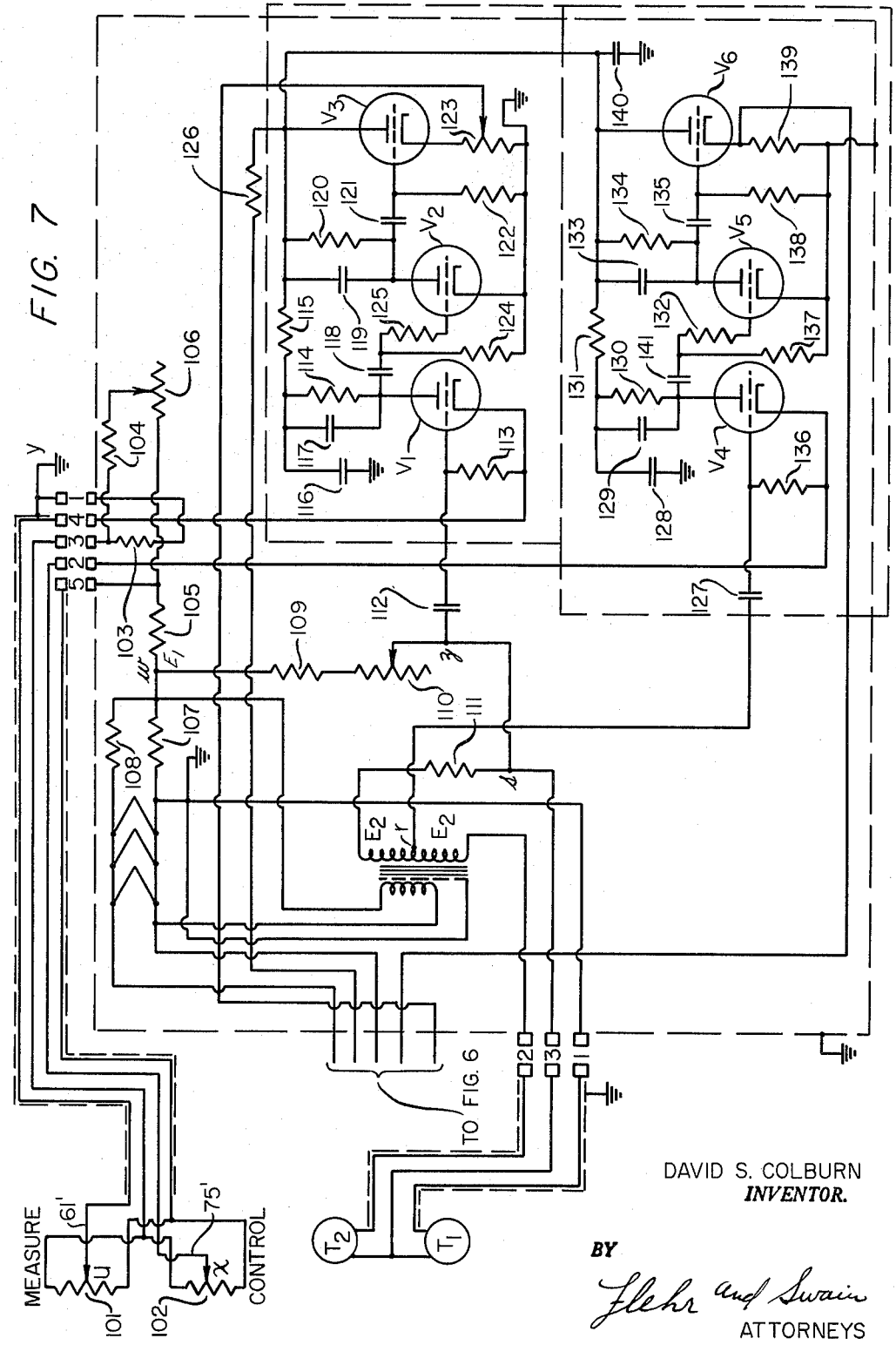

United States Patent Office 3,246,688
Patented Apr. 19, 1966

3,246,688
CONTROLLED TEMPERATURE APPARATUS
David S. Colburn, Palo Alto, Calif., assignor to Beckman
Instruments, Inc., a corporation of California
Filed June 28, 1962, Ser. No. 205,980
11 Claims. (Cl. 165—39)

This invention relates to apparatus having a controlled temperature region wherein an object is disposed and its temperature maintained constant. The apparatus is particularly useful, for example, in centrifuges incorporating controlled temperature rotor environment.

The requirements of such centrifuge systems are explained generally in U.S. 2,885,188 and will not be repeated here other than to say that the accuracy with which certain centrifugation computations can be made is directly dependent upon the accuracy with which the temperature of the rotor is measured and maintained constant.

As is well known, rotors of ultracentrifuges are generally operated in an evacuated enclosure to reduce the drag. The rise in temperature due to friction between the rotor and the surrounding air is thereby considerably reduced. This minimizes temperature gradients through the rotor which would set up gradients within the solution under examination which is carried in the rotor. A change in the speed of the rotor will cause changes in its equilibrium temperature.

It is desirable to compensate or correct for these temperature changes since they introduce errors into the analysis and may even result in destruction of the sample. The evacuated enclosure in which the rotor is mounted is generally refrigerated by means having on-off control. Additional temperature control means are desirable to maintain the rotor at a constant temperature.

Although the temperature of the rotor at a particular instant may be obtained by indirect methods such as measuring the temperature before and after a run and assuming that it varies linearly, it is preferable to obtain the temperature directly. This has meant that a temperature sensitive element has needed to be mounted on the rotor. In the past the electrical contacts between the rapidly rotating rotor and the stationary measuring system have not been entirely satisfactory.

In the apparatus as disclosed herein black body radiation coupling is utilized to sense the rotor temperature thereby avoiding the problems introduced by such electrical contacts. Thus, the temperature of the rotor can be taken directly and used to control refrigeration equipment which usually surrounds the "can" or rotor enclosure.

However, since there is necessarily a time lag between the time the "can" reaches the desired temperature and the time when the rotor reaches the same temperature, it will be apparent that the can will continue to be refrigerated by the refrigeration equipment until the rotor reaches the proper temperature. By this time, however, the can is far too cold and will continue to drop the rotor temperature below that desired. It is apparent that the reverse will also be true when the refrigeration of the can is turned "off." The result then is an undesirable "hunting" across the desired rotor temperature.

On the other hand, if the temperature of the can were to be used for control purposes, then cooling of the rotor follows an asymptotic curve requiring an extremely long time to arrive at the desired rotor temperature.

According to the disclosed arrangement, the refrigeration equipment is responsive proportionately to both the temperature of the rotor and the can whereby the rotor temperature can be quickly dropped without the problem of hunting.

Therefore, it is generally an object of the invention to provide an improved controlled temperature apparatus.

It is another object to provide means for accurately sensing the temperature of an object disposed within a controlled temperature region where the region is subject to temperature changes, and to maintain the temperature of the object constant without hunting.

It is yet another object to provide a centrifuge with a refrigeration control circuit under control of both the temperature of the rotor and the can.

These and other objects of the invention will become more clearly apparent from the following description when taken in conjunction with the accompanying drawings, in which.

Figure 6:
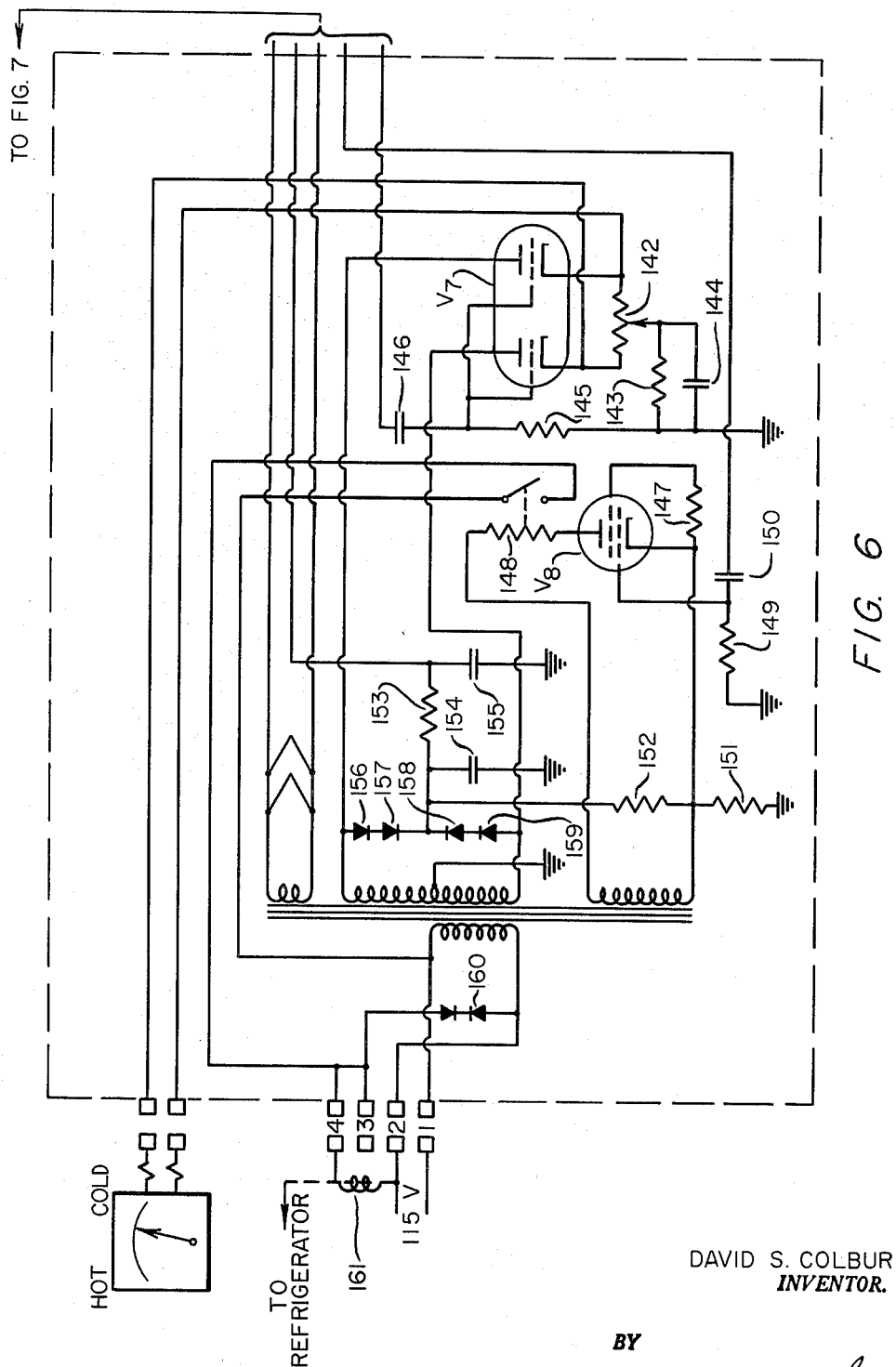

FIGURES 6 and 7 taken together show an electrical circuit embodying the invention.

Figure 1:
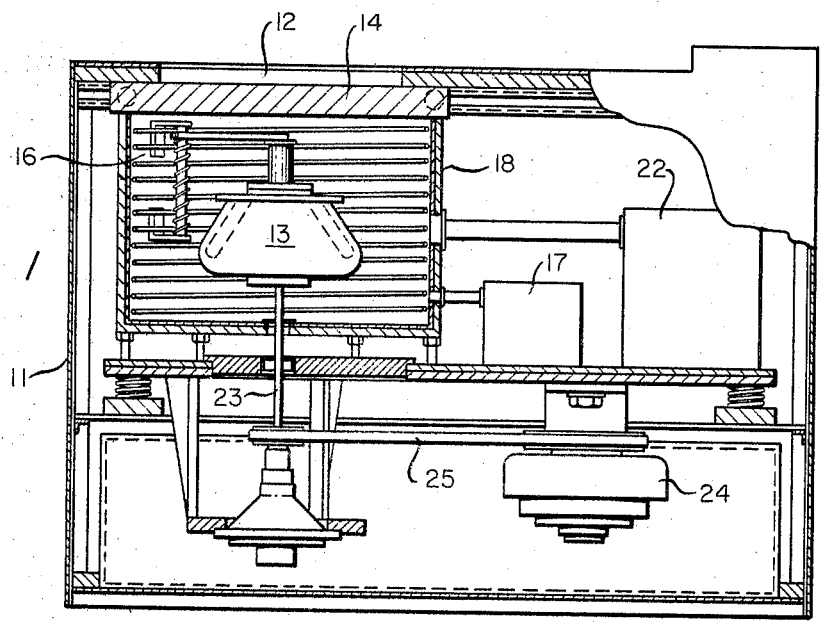
FIGURE 1 is a schematic front elevation of a centrifuge apparatus.
Figure 8:
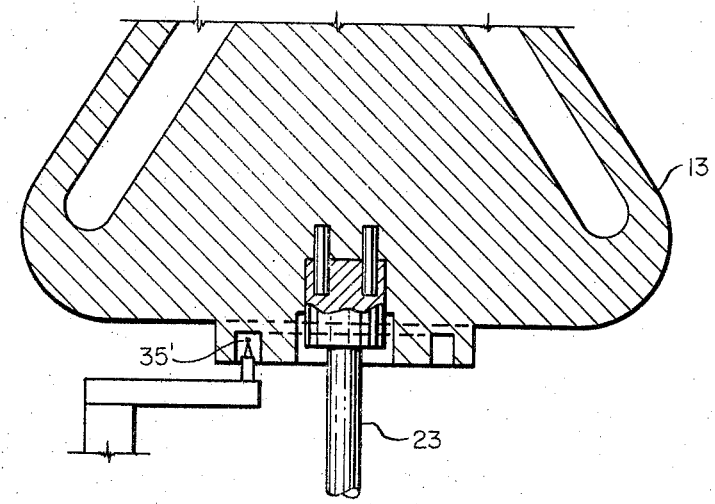

FIGURE 8 schematically shows another arrangement for radiation coupling a temperature sensitive transducer to the rotor assembly.

The centrifuge apparatus as illustrated in the drawing is of a type generally as shown for example in U.S. 2,878,992 and comprises an outer housing 11 which serves to house the working parts. The top of the housing is provided with an opening 12 through which the rotor 13 may be installed and removed. A sliding door 14 serves to cover the hole. In centrifugation the sample to be analyzed is sealed and carried within the rotor 13. The rotor spins within a heavy steel chamber 16 which is evacuated by a suitable pump such as an oil diffusion pump 17 and a vacuum mechanical pump not shown. Added protection against rotor explosion is provided by a thick steel ring 18. Suitable seals not shown are provided on the cover for maintaining the vacuum within the rotor environment. When the rotor is operated at full speed with a good vacuum, its rate of temperature rise is in the neighborhood of one degree centigrade per hour with the surroundings at a comparable temperature. Even this rise can be eliminated by adjusting the average temperature of the surroundings about 10 to 15° centigrade below the rotor by cooling the surroundings. Thus, the enveloping cylinder 16 is refrigerated by compressor unit 22.

Figure 4:
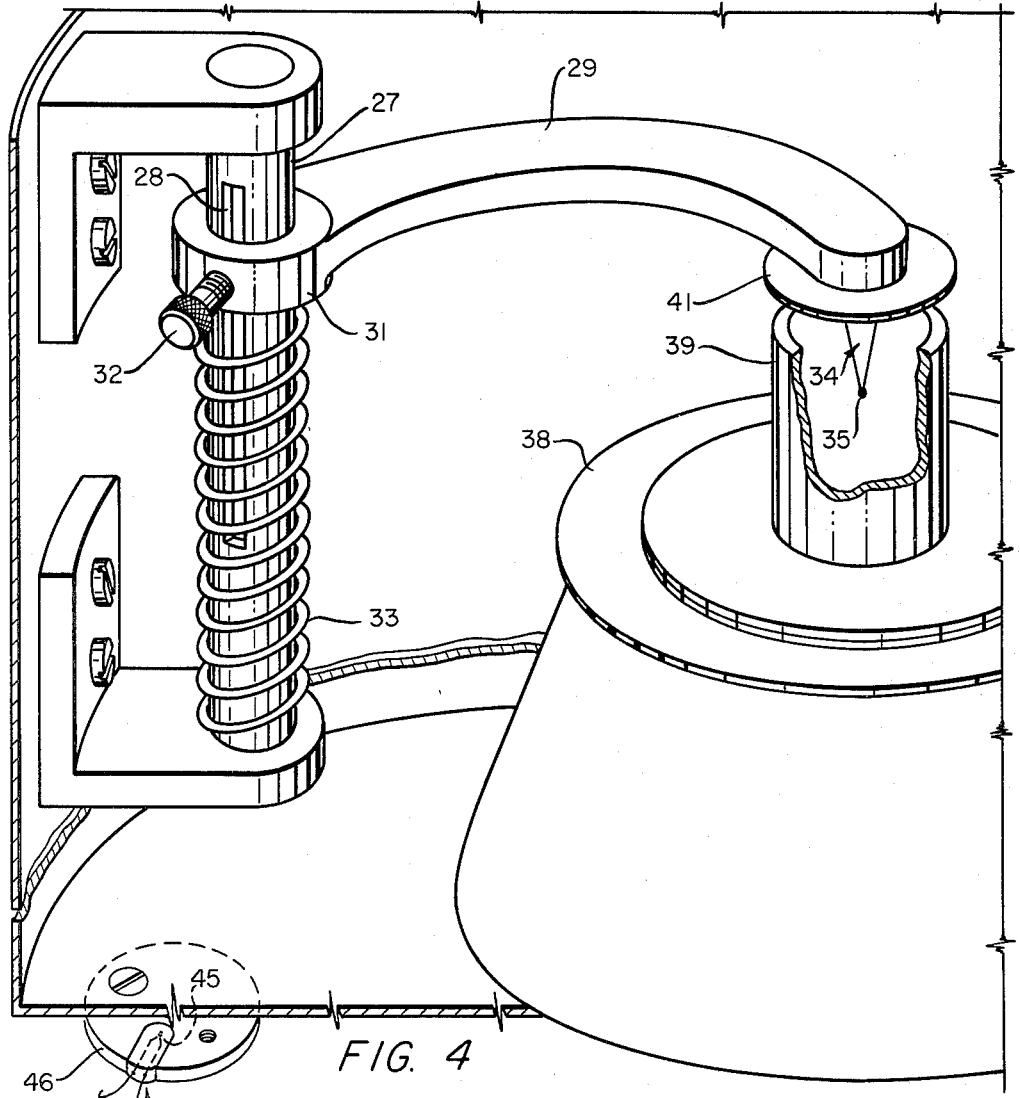
FIGURE 4 shows means for radiation coupling a temperature sensitive transducer to the rotor assembly.
Figure 5:
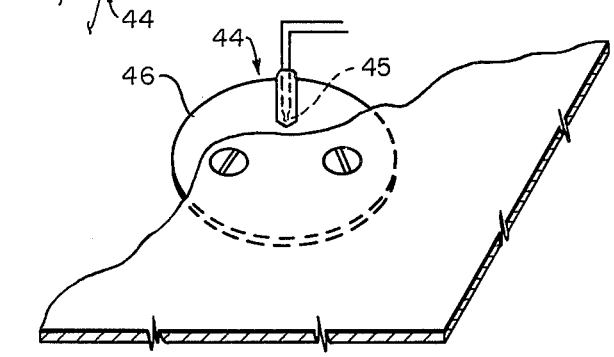
FIGURE 5 shows attachment of a temperature sensitive transducer to the "can."

The rotor spins in the evacuated chamber about a flexible axis and is flexibly suspended by a shaft 23. The load is carried by mechanical bearings. A suitable electric drive motor 24 drives the shaft at high speeds via pulley 25. Referring to FIGURE 4 there is shown in detail means for black body radiation coupling a temperature sensitive transducer with the rotor so as to sense the temperature of the latter without making mechanical contact therewith.

Mounted from the side of the chamber is a fixed hinge pin 27 having a longitudinal slot 28 formed therein. An arm 29 of generally arcuate structure is arranged to move up and down on bracket 27 by means of the hub 31. A set screw 32 serves to lock arm 29 in a vertical position on hinge pin 27 against the upward urging of spring 33. Rotational movement of arm 29 is prevented whenever set screw 32 is in engagement with slot 28.

On the end of arm 29 there is mounted a temperature responsive transducer assembly 34 including a temperature sensitive element, such as a thermistor element 35 encapsulated in the distal end of assembly 34. As is well known, thermistors have a highly negative temperature coefficient of resistance and hence increase in resistance with a decrease in temperature. The rotor is formed with a cover 38 including a cylindrically shaped upstanding hollow handle 39 formed integrally therewith, the interior of which is coated as a black body insulator. Transducer assembly 34 is further provided with a flange 41 which serves to cover the open end of handle 39. Flange 41 is likewise black body insulated so that thermistor 35 is radiation coupled to the interior of rotor handle 39 and hence to the rotor. Where the rotor is made of aluminum, heat conduction is very good, so that the temperature of the handle 39 approximates that of the rotor. Of course, other heat conductive materials will work satisfactorily.

On the bottom of the can there is a second temperature sensitive transducer assembly 44 including an encapsulated thermistor 45 disposed in a slot formed in an aluminum disk 46. Disk 46 is secured tightly to the bottom of the can after having scraped the surface of the latter clean so as to effect optimum heat transfer therebetween. Thus, thermistor 45 senses the temperature of the can.

In certain centrifuge apparatus, for example of the continuous flow type, the top of the rotor may be obstructed by apparatus pertaining thereto and accordingly another arrangement for sensing the rotor temperature is shown in FIGURE 8. This arrangement schematically shows the bottom of a rotor wherein an annular groove is formed in the bottom thereof so as to receive a temperature sensitive transducer 35'.

Figure 2:
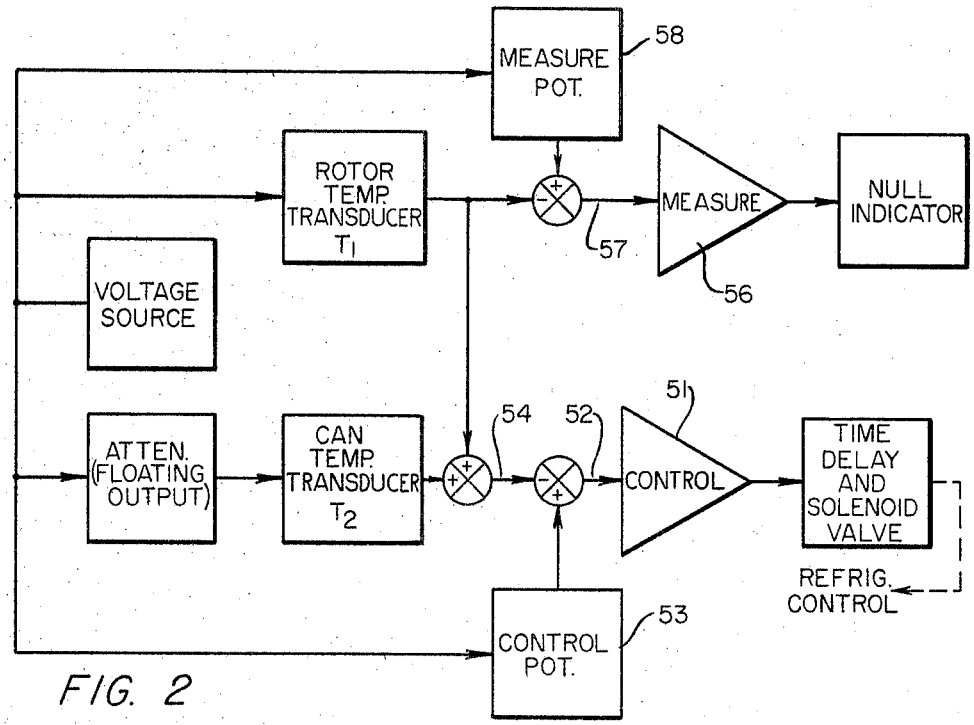
FIGURE 2 is a logic diagram of the control circuit of the invention.

As shown in FIGURE 2 the logic of the apparatus for controlling the temperature of the rotor is shown diagrammatically wherein control of the refrigeration apparatus associated with the can is dependent upon signals generated by both the rotor transducer and the can transducer, whereas measurement of the rotor temperature is made independent of the control function while using the same rotor transducer.

There is provided a control amplifier 51 having an input 52 which is represented as the difference between the voltage set on a control potentiometer 53 and the sum of the voltage which is developed across transducers T1 and T2 as they appear for example on an input 54. On the other hand a measurement amplifier 56 receives an input 57 representative of the difference between the voltage set on a measurement potentiometer 58 and the voltage across T1. It should be noted that the voltage developed across T2 does not influence the input to the measurement amplifier as it is substantially completely floating, except for a possible path through the input impedance of the control amplifier and back through the control potentiometer. This effect can be eliminated, if desired, by suitable means although in the present instance its effect is negligible because of the very high input impedance to the amplifiers. The output of the measurement amplifier can either be arranged to give a direct reading signal or, as shown herein and described below, can be coupled to a null indicating meter whereby nulling the current across a bridge is accomplished by displacing a dial from its zero reading position thereby giving an indication of the temperature equivalent to the signal on input 57.

The output of the control amplifier is fed through a suitable time delay circuit to the control solenoid of the refrigeration equipment so as to prevent chattering of the solenoid valve. This can be accomplished, for example, by using a thyratron wherein the control amplifier is coupled to the grid of the former and the anode is supplied with an A.C. signal which makes it a phase sensitive trigger that fires each half cycle. When the thyratron is firing, the time delay relay will delay the operation of the solenoid valve. While this will add the effect of causing some minimal degree of overshoot, the thermal constant is so much longer that this is a negligible consideration.

Figure 3:
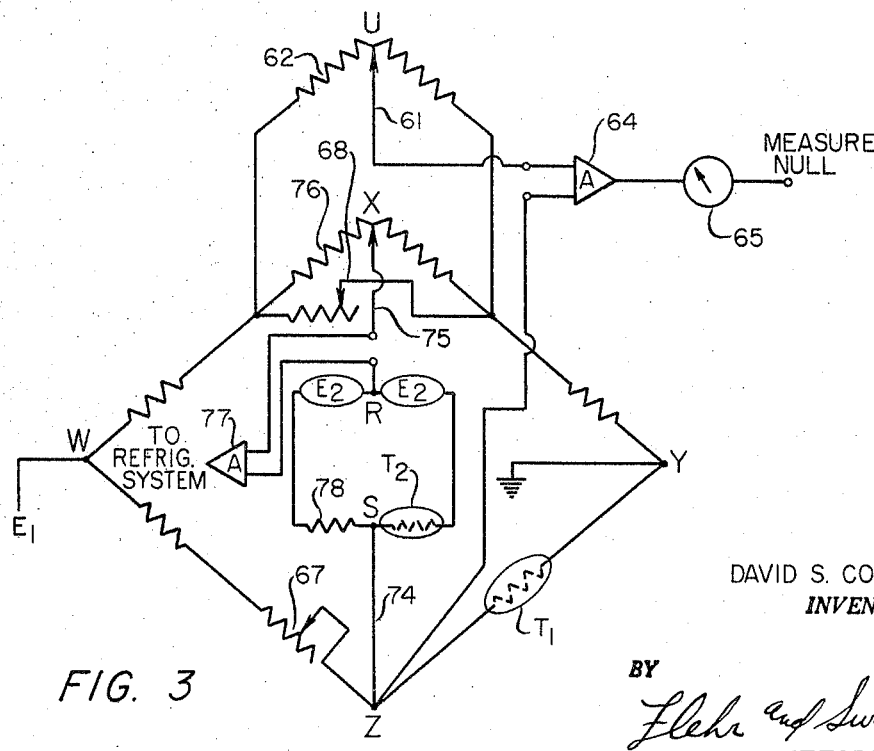
FIGURE 3 is a schematic circuit diagram of the invention.

As shown in FIGURE 3 there is provided a first bridge circuit which incorporates transducer T1 responsive to rotor temperature to the substantial exclusion of the can transducer T2 so as to measure the temperature of the rotor. There is further provided a second bridge circuit which controls the refrigeration means and which includes both the first and the second transducer. Thus, the temperature of the can is introduced as a factor into the control of refrigeration equipment while being substantially excluded from the measurement of the rotor temperature. It has been found that if the contribution which the rotor transducer makes with respect to the contribution made by the can transducer is generally around a factor of 20–1, satisfactory results are achieved. However, this ratio will of course vary between different types of equipment depending upon such factors as the mass, velocity, etc.

In order to measure the temperature of the rotor there is shown in FIGURE 3 a bridge circuit connected between points W, U, Y and Z of the circuit thereshown. Electric potential is applied between points W and Y as represented by $E_1$. The wiper 61 of a potentiometer 62 is connected in the detecting branch between points U and Z. Branch UZ further includes a conventional amplifier 64 and a null measuring means such as a galvanometer 65 connected thereto. As thus arranged wiper 61 can be varied so as to zeroize the current in branch UZ by balancing the branch resistances in each of the four branches WU, UY, YZ, and ZW. The degree to which wiper 61 is displaced from its normal position (which would usually be at the mid-point of potentiometer 62) in order to zeroize the current in branch UZ, therefore gives a representation which, when calibrated, can be converted to the temperature of the rotor. In other words the degree to which wiper 61 must be displaced to compensate for changes in the resistance of T1 to effect a balancing of the bridge network gives an indication of the temperature in the rotor since the rotor temperature causes the resistance in T1 to vary. Variable resistors 67 and 68 are provided with set screws (not shown) for establishing an initial balanced resistance condition of the circuits whereby calibration from the center tap of potentiometer 62 can be established, as well as calibration of potentiometer 76 in like manner.

The bridge circuit for controlling the refrigeration function may be defined by the points WXY and Z and the detecting branch XZ includes an attenuator circuit RS incorporating the transducer T2 located on the can. Circuit RS includes a pair of resistance elements in parallel one of which is thermistor T2 together with a pair of sources of equal voltage $E_2$ which can be achieved, for example, by using a center tap coil as the secondary of a transformer. By reducing the voltages $E_2$ to approximately $\frac{1}{20}$ of the voltage $E_1$ the control contribution of thermistor T2 can be rendered less effective by a like proportion with respect to the effect of T1. Detecting branch XZ also includes a wiper 75 of potentiometer 76. Detecting branch XZ includes an amplifier 77 operatively coupled to the refrigeration system solenoid control means.

In operation, with the wipers 61 and 75 at their respective mid-points on potentiometers 62 and 76 and resistances 67 and 68 set and locked so as to provide proper calibration, the temperature of the rotor can be measured by sliding wiper 61 along potentiometer 62 until the resistance in branch UY equals the resistance in branch YZ thereby eliminating a potential across detecting branch UZ as measured by the galvanometer 65. The amount of displacement of wiper 61, therefore provides a direct reading of the temperature of the rotor.

In order to cool the rotor to a desired temperature wiper 75 is adjusted by a dial (not shown) associated therewith to the desired temperature. This variation of the resistance in branch XY develops a voltage across the detecting branch XZ to provide a control signal sensed and amplified by amplifier 77. The signal sensed by amplifier 77 is, however, adjusted by the presence of the floating attenuator circuit between points R and S located in the detecting branch XZ. This adjustment may be explained by the fact that where resistance element 78 and the resistance of thermistor T2 are of equal value the voltage at point S is the same as at point R and no such adjustment is provided. However, when the resistance of T2 changes with changes in temperature of the can, a voltage will be developed between points R and S which will be combined either positively or negatively with the voltage differential generated by the difference in resistance between branch XY and YZ.

Thus, it can be seen that changes in "can" temperature caused by ambient conditions are introduced as a factor in control of the temperature of the rotor so as to minimize "hunting" across the desired rotor temperature.

In one particular instance the circuit shown by the combination of FIGURES 6 and 7 was constructed with components as listed. The respective values of the various resistors, where K equals 1,000 ohms, were:

| | |
|---|---|
| 103—.150 ohms | 130—1,000K |
| 104—.820 ohms | 131—1,000K |
| 105—.150 ohms±1% | 132—100K |
| 107—6.8 ohms±5% | 134—1,000K |
| 108—.056 ohms±5% | 136—22,000K |
| 109—1.5K at 1 watt | 137—22,000K |
| 111—1.3K | 138—22,000K |
| 113—22,000K | 139—10K |
| 114—1,000K | 143—30K, 2W |
| 115—100K | 145—1,000K |
| 120—1,000K | 147—100K |
| 122—22,000K | 149—1,000K |
| 124—22,000K | 151—5.1K |
| 125—5,100K | 152—510K, 1W |
| 126—5K | 153—5.1K |

The respective values in microfarads of the various condensers were:

| | |
|---|---|
| 112—.01 | 133—.003 |
| 116—10 at 350 WVD.C.[1] | 135—.003 |
| 117—.003 | 140—10 at 350 WVD.C. |
| 118—.003 | 141—.003 |
| 119—.003 | 144—1 at 200 WVD.C. |
| 121—.003 | 146—.1 at 200 WVD.C. |
| 127—.01 | 150—.1 at 200 WVD.C. |
| 128—10 at 350 WVD.C. | 154—50 at 350 WVD.C. |
| 129—.003 | 155—30 at 350 WVD.C. |

[1] Working volts direct current.

The diodes numbered 156–159 employed are known by manufacturer's specifications as SD94 silicon diodes.

Tubes V1 to V7 are known as 12AX7 and tube V8 as 2D21.

The normally open thermal time delay relay 148 provided approximately 20 sec. time delay, and normally closed solenoid 161 for operating the refrigerating system was conventional.

Potentiometers had the following resistance values where K represents 1,000 ohms:

| | |
|---|---|
| 101—1K | 123—10K with wiper set substantially 2K from bottom |
| 102—1K | |
| 106—3K | |
| 110—2K | 142—2.5K |

Element 160 is a selenium contact protector using an arc suppression diode, I.R.C. number S6V6P.

Thermistors T1 and T2 were 1,000 ohm, bead type, manufactured by Victory Engineering Corp., New Jersey and identified as manufacturer's number 31A12.

Finally, 115 volts A.C. was utilized.

In the foregoing particular instance as shown in FIGURES 6 and 7, lower case letters corresponding to the upper case letters of the bridge networks of FIGURE 3 have been used for ease in correlating the figures.

The tubes $V_1$–$V_3$ are arranged in circuit in FIGURE 7 to serve as the measurement amplifier 64. Thus, point "z" is connected through capacitance 112 and point "$\mu$" is established by the position of wiper 61'.

Tubes $V_4$–$V_6$ are connected in circuit between points "r" and "x" to serve as the control signal amplifier 77 as represented in FIGURE 3.

Tube $V_8$ serves as a phase sensitive trigger control for operating a thermal responsive switch element 148 located in the plate circuit thereof thereby operating the refrigeration solenoid 161.

The period of thermal response in element 148 provides suitable time delay to prevent valve shatter.

Finally, tube $V_7$ is connected to serve as a phase sensitive detector in the temperature measurement circuit including the temperature indicator shown.

I claim:

1. In apparatus for controlling the temperature of an object disposed within a temperature controlled environment, an enclosure defining the environment, heat exchange means for altering the temperature of the enclosure, a first and second temperature sensitive transducer, said first transducer being disposed to sense primarily the temperature with respect to the object within the environment, said second transducer being disposed to sense primarily the temperature with respect to said enclosure, control circuit means operatively coupled to control said heat exchange means, said control circuit means being responsive to the conjoint conditioning of both said first and second transducers in predetermined proportionate degree, and means coupled to the last named means and serving to read out the thermal condition of said first transducer substantially independently of the control circuit means.

2. In apparatus for controlling the temperature of an object disposed within a temperature controlled environment, an enclosure defining the environment, heat exchange means for altering the temperature of the enclosure, a first and second temperature sensitive transducer, said first transducer being disposed to sense primarily the temperature with respect to the object within the environment, said second transducer being disposed to sense primarily the temperature with respect to said enclosure, first circuit means responsive to said first transducer to the substantial exclusion of said second transducer to measure the temperature of said object and second circuit means operatively coupled to control said heat exchange means and including both said first and second transducers for controlling the temperature of said enclosure, said first transducer being coupled in common to both said first and second circuit means.

3. Temperature controlling apparatus as defined in claim 2 wherein said second circuit means includes a bridge circuit means having a plurality of branches, one of said branches including said first transducer, said bridge circuit means further including a detecting branch including said second transducer, said heat exchange means being operatively coupled to said detecting branch and arranged to respond to the conjoint conditioning of both said transducers.

4. Temperature controlling apparatus as defined in claim 3 wherein said first circuit means includes a bridge circuit, a detection branch in the last said bridge circuit, means for examining the electrical condition of the last said detection branch, said first transducer being included in both the first and the last said bridge circuit, and the last said detection branch being coupled to respond to the electrical condition of said first transducer to provide indication of the temperature of said object.

5. In centrifuge apparatus, a temperature controlled chamber, a centrifuge rotor within said chamber, means for rotating said rotor, heat exchange means for altering the temperature of said chamber, a first and second temperature sensitive transducer, said first transducer being disposed to sense temperature with respect to said rotor, said second transducer being disposed to sense temperature with respect to said chamber, first circuit means responsive to said first transducer to the substantial exclusion of said second transducer to measure the temperature of said rotor, and second circuit means operatively coupled to control said heat exchange means and including both said first and second transducers for controlling the temperature of said chamber, said first transducer being coupled in common to both said first and second circuit means.

6. Centrifuge apparatus as defined in claim 5 wherein said first transducer is black body radiation coupled to said rotor to sense the temperature of same.

7. Centrifuge apparatus as defined in claim 5 wherein said first circuit means includes a bridge circuit, a detection branch in said bridge circuit including means for sensing and amplfying electrical signals thereon to measure the temperature of said rotor.

8. In centrifuge apparatus, a temperature controlled chamber, a centrifuge rotor within said chamber, means for rotating said rotor, heat exchange means for altering the temperature of said chamber, a first and second temperature sensitive transducer, said first transducer being disposed to sense temperature with respect to said rotor, said second transducer being disposed to sense temperature with respect to said chamber, control circuit means operatively coupled to control said heat exchange means, said control circuit means being conjointly responsive to both said first and second transducers in predetermined proportionate degree dominated primarily by said first transducer.

9. Centrifuge apparatus as defined in claim 8 wherein said control circuit means serves to establish said predetermined proportionate degree substantially in the ratio of 20 to 1 respectively of said first and second transducers.

10. Centrifuge apparatus as defined in claim 8 wherein the control circuit means includes a first bridge circuit having a plurality of branches, one of said branches including said first transducer, means forming a second bridge circuit, said second bridge circuit including a detecting branch coupled between parallel sides thereof, said detecting branch including said second transducer, said heat exchange means being operatively coupled to said detecting branch, and said bridge circuits being coupled to control said heat exchange means via said detecting branch in response to the combined signals developed by both said transducers.

11. Centrifuge apparatus as defined in claim 10 further including measurement circuit means in said first bridge circuit and comprising a detection branch in said first bridge circuit, means for examining the electrical condition of the last said detection branch, the detection branch of said first bridge circuit being coupled to respond to the electrical condition of said first transducer to indicate the temperature of said rotor.

References Cited by the Examiner

UNITED STATES PATENTS

| | | | |
|---|---|---|---|
| 2,375,988 | 5/1945 | Gille et al. | 165—28 |
| 2,885,188 | 5/1959 | Pickels et al. | 233—11 |
| 3,002,226 | 10/1961 | Worthen | 165—11 |

FREDERICK L. MATTESON, JR., Primary Examiner.

CHARLES SUKALO, Examiner.